Patented July 26, 1949

2,477,149

UNITED STATES PATENT OFFICE 2,477,149

PROCESS FOR PREPARING PENICILLAMINES

John C. Sheehan, Arlington Heights, Mass., and Max Tishler, Rahway, N. J., assignors to Merck & Co., Inc., Rahway, N. J., a corporation of New Jersey No Drawing. Application January 29, 1947, Serial No. 725,148

8 Claims. (Cl. 260—534)

This invention is concerned generally with improved processes for manufacturing halogen acid salts of penicillamine. More particularly it relates to the preparation of said penicillamine hydrohalides from α-amino-β-benzyl-mercapto-isovaleric acid. These penicillamine hydrohalides can be readily converted into penicillamine, which is useful as a primary intermediate in the synthesis of penicillin and chemically related substances being antibiotic activity.

Applicants have discovered that these penicillamine hydrohalides, which can be chemically designated as α-amino-β-mercapto-isovaleric acid hydrohalides, can be prepared by reacting α-amino-β-benzylmercapto-isovaleric acid, at an elevated temperature, with aqueous hydrohalic acid. This reaction may be chemically represented as follows:

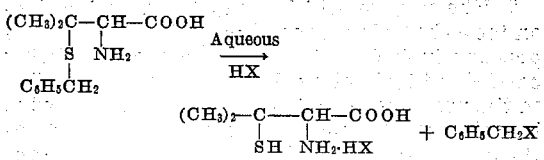

wherein HX is a hydrogen halide.

The α-amino-β-benzylmercapto-isovaleric acid starting material can be prepared as follows: hippuric acid, acetone, acetic anhydride, and sodium acetate, are heated under reflux to form an azlactone, which is then reacted with a solution of benzyl mercaptan in methanolic sodium methoxide to form dl - N:S - dibenzyl - β,β - dimethyl-cysteine; hydrolysis of this compound produces dl-α-amino-β-benzylmercapto-isovalerate. The reactions indicated above are described in detail in the University of Oxford Report No. Pen-100. Either the racemic form or an optically active isomer of α-amino-β,β-benzylmercapto-isovaleric acid can be employed as the starting material in applicants' process whereby salts of dl-penicillamine, or an optically active isomer thereof, are obtained, respectively. When the dextrorotatory stereoisomer of α-amino-β-benzylmercapto-isovaleric acid is employed the product obtained is d-penicillamine hydrohalide, which can be converted directly to physiologically active penicillin, as described in a copending application of applicants' assignee, Serial No. 656,772, filed March 23, 1946.

Although any aqueous hydrohalic acid can be utilized in the reaction, it is preferred to utilize aqueous hydrobromic acid or aqueous hydriodic acid. Aqueous hydrochloric acid can likewise be used but since it reacts more slowly the reaction, in this case, is best carried out at elevated temperature under pressure. The reaction temperature can be varied widely although it has been found convenient to carry out the reaction at the boiling point under atmospheric pressure. The time required for substantially complete reaction varies between about two and about twenty-four hours, dependent upon the temperature, the particular hydrohalic acid used, and upon its concentration.

The hydrohalic acid employed should be moderately concentrated, and since it is desirable to keep the concentration of the acid substantially constant, it is preferred to employ a constant boiling acid, such as 48% hydrobromic acid. The acid concentration is conveniently maintained by carrying out the reaction in a vessel equipped with a variable-take-off fractionating column, whereby the water, resulting from neutralization of the α - amino - β - benzyl - mercapto-isovaleric acid is removed.

The reaction mixture is heated, preferably in the presence of an inert atmosphere, such as nitrogen (to avoid the possibility of oxidation of penicillamine by air), until no more benzyl halide is formed, water and benzyl halide being removed continuously, or at intervals if preferred, during the reaction period by means of the variable take-off fractionating column. Unreacted α-amino - β - benzylmercapto-isovalerate acid, in the form of its hydrohalic acid salt, is usually removed by filtration of the cooled reaction mixture. The penicillamine salt is recovered from the resulting solution by any convenient method, as for example, by evaporating to dryness, whereupon the crude penicillamine hydrohalide is obtained as an amorphous resin-like product. This crude material is purified by digestion with a solvent, such as ether, which removes benzyl halide and other impurities, and gradually changes over to a slurry of the crystalline hydrate of the penicillamine salts. These salts are recovered by filtration and can be converted into free penicillamine by known methods, such as treatment with alcohol and pyridine.

The following examples illustrate methods of carrying out applicants' novel and improved process, but it is to be understood that these examples are given by way of illustration and not of limitation.

*Example 1*

A suspension of 40 g. of dl-α-amino-β-benzyl-mercapto-isovaleric acid in 600 ml. of 48% hydrobromic acid was heated under reflux in a nitrogen atmosphere under a total reflux variable-take-off fractionation column packed with glass helices. After fifteen minutes, 15 ml. of water and some benzyl bromide was drawn off. After thirty minutes, an additional 35 ml. of water and some benzyl bromide was withdrawn. After refluxing for sixteen hours the pale, amber colored solution was cooled and filtered from 3.35 g. of S - benzyl-dl-penicillamine hydrobromide. Evaporation to dryness under reduced pressure and digestion with ether gave, after drying over potassium hydroxide pellets in vacuo, 35.8 g. (94%) of colorless crystalline dl-penicillamine hydrobromide hydrate.

This product was identified by conversion to the corresponding thiazolidine derivative by dissolving 17.9 g. of the crude hydrobromide in 25 ml. of acetone. After removing a trace of solid impurities by centrifugation, the solution was allowed to crystallize over a two hour period at 0-5° C. The weight of dl-2,2,5,5-tetramethyl-4-carboxy-thiazolidine hydrobromide obtained was 15.97 g. (yield 82% of theory), M. P. 200–202° C. dec.; after two recrystallizations from acetone, the product melted at 202–203° C. dec.

Anal.: Calcd. for $C_8H_{16}O_2NSBr$: C, 35.56; H, 5.97. Found: C, 35.26; H, 6.13.

*Example 2*

A suspension of 10 g. of dl-α-amino-β-benzyl-mercapto-isovaleric acid in 100 ml. of 58% hydriodic acid was heated at reflux under nitrogen for 2 hours. After filtration the solution was concentrated to dryness and the residue was digested with ether, as described in Example 1, to produce 4.67 g. (yield 38% of theory) of crude dl-penicillamine hydroiodide.

*Example 3*

A mixture of 3 g. of d-α-amino-β-benzyl-mercapto-isovaleric acid and 48% hydrobromic acid was heated under reflux twenty-four hours in a nitrogen atmosphere. The solution was cooled to 0° C. for 3 hours but only a negligible amount of solid was removed by filtration. The solution was then concentrated to dryness to produce crude d-penicillamine hydrobromide. This product was converted to the corresponding thiazolidine by dissolving the residue in 10 ml. acetone; the acetone solution was centrifuged, and crystallization was initiated by the addition of ether. The weight of colorless d-2,2,5,5-tetramethyl-4-carboxy-thiazolidine hydrobromide obtained was 1.98 g. (yield 58% of theory); $[\alpha]_D^{25°} = 77°$ measured in 1% aqueous solution. The fact that the thiazolidine derivative is optically active indicates that no racemization occurred during the hydrobromic acid treatment of the d-α-amino-β-benzylmercapto-isovaleric acid. When this thiazolidine compound is dissolved in water and the water evaporated, d-penicillamine hydrobromide is obtained in substantially pure form.

Modifications may be made in carrying out the present invention without departing from the spirit and scope thereof, and the invention is to be limited only by the appended claims.

We claim:

1. The process of preparing a hydrohalic acid salt of penicillamine, which comprises heating α-amino-β-benzylmercapto-isovaleric acid, at an elevated temperature, with an aqueous solution of a hydrohalic acid.

2. The process of preparing dl-penicillamine hydrohalide which comprises heating dl-α-amino-β-benzylmercapto-isovaleric acid, at an elevated temperature, with an aqueous solution of a hydrohalic acid.

3. The process of preparing d-penicillamine hydrohalide which comprises heating d-α-amino-β-benzylmercapto-isovaleric acid, at an elevated temperature, with an aqueous solution of a hydrohalic acid.

4. The process of preparing dl-penicillamine hydrobromide which comprises reacting dl-α-amino-β-benzylmercapto-isovaleric acid with aqueous hydrobromic acid, said reaction being carried out by heating the reactants under reflux in the presence of an inert atmosphere, removing benzyl bromide and part of the water by fractional distillation of the reaction mixture, and recovering dl-penicillamine hydrobromide from the aqueous reaction solution.

5. The process of preparing dl-penicillamine hydroiodide which comprises reacting dl-α-amino-β-benzylmercapto-isovaleric acid with aqueous hydriodic acid, said reaction being carried out by heating the reactants under reflux in the presence of an inert atmosphere, removing benzyl iodide and part of the water by fractional distillation of the reaction mixture, and recovering dl-penicillamine hydroiodide from the aqueous reaction solution.

6. The process of preparing d-penicillamine hydrobromide which comprises reacting d-α-amino-β-benzylmercapto-isovaleric acid with aqueous hydrobromic acid, said reaction being carried out by heating the reactants under reflux in the presence of an inert atmosphere, removing benzyl bromide and part of the water by fractional distillation of the reaction mixture, and recovering d-penicillamine hydrobromide from the aqueous reaction solution.

7. The process which comprises reacting d-α-amino-β-benzylmercapto-isovaleric acid with aqueous hydrobromic acid, said reaction being carried out by heating the reactants under reflux in the presence of an inert atmosphere, removing benzyl bromide and part of the water by fractional distillation of the reaction mixture, separating insoluble impurities by filtering the resulting aqueous solution, evaporating said solution substantially to dryness to produce crude d-penicillamine hydrobromide, treating this crude material with acetone and crystallizing to produce substantially pure d-2,2,5,5-tetramethyl-4-carboxy-thiazolidine hydrobromide, and hydrolyzing this compound to produce substantially pure d-penicillamine hydrobromide.

8. The process which comprises reacting dl-α-amino-β-benzylmercapto-isovaleric acid with aqueous hydrobromic acid, said reaction being carried out by heating the reactants under reflux in the presence of an inert atmosphere, removing benzyl bromide and part of the water by fractional distillation of the reaction mixture, separating insoluble impurities by filtering the resulting aqueous solution, evaporating said solution substantially to dryness to produce crude dl-penicillamine hydrobromide, treating this crude material with acetone to produce substantially dl-2,2,5,5-tetramethyl-4 - carboxy-thiazolidine hydrobromide, and hydrolyzing this compound to produce substantially pure dl-penicillamine hydrobromide.

JOHN C. SHEEHAN.
MAX TISHLER.

(References on following page)

REFERENCES CITED

The following references are of record in the file of this patent:

UNITED STATES PATENTS

| Number | Name | Date |
|---|---|---|
| 2,406,362 | Farlow | Aug. 27, 1946 |

OTHER REFERENCES

Science, vol. 105, June 27, 1947, pages 653 and 658.

Committee et al., "Science," vol. 102, Dec. 21, 1945, page 628.

Abraham et al.: "Nature," vol. 151, Jan. 23, 1943, page 107.

Carter et al.: "J. Biol. Chem.," vol. 139 (1941), page 252.

Woodward et al.: "J. Am. Chem. Soc.," vol. 59 (1937), pages 1690–1694.

Merck Report XII-$d$, dated Feb. 18, 1944, page 3 (Sept. 27, 1945).

Pfizer & Co. Inc. "Chem. Studies on Penicillin," Nov. 1944 (Sept. 27, 1945, page 9).

McOmie et al.: British Reports CPS–32, March 20, 1944, pages 1–3 (Sept. 27, 1945).

Cornell University, "Chem. Studies on Penicillin," No. 1, Feb. 17, 1944, page 12 (Sept. 27, 1945).

(The last four reports are available in Div. 59.)